Figure 5A:

March 14, 1967  L. ALFILLE ETAL  3,309,283
FUEL PENCILS HAVING A THIN FLEXIBLE CAN FOR NUCLEAR REACTORS
Filed July 19, 1965  2 Sheets-Sheet 1
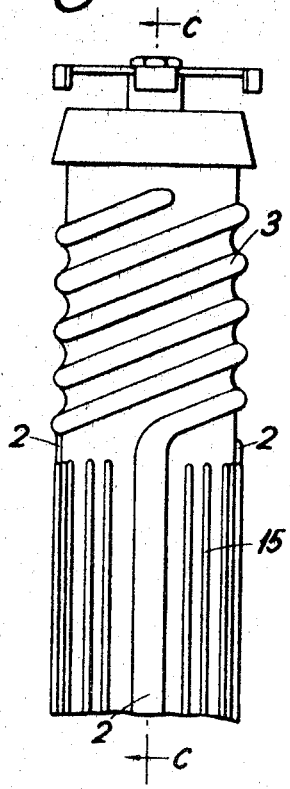
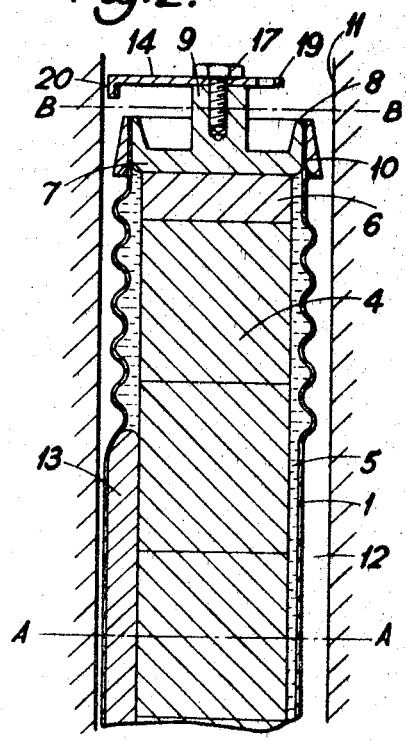
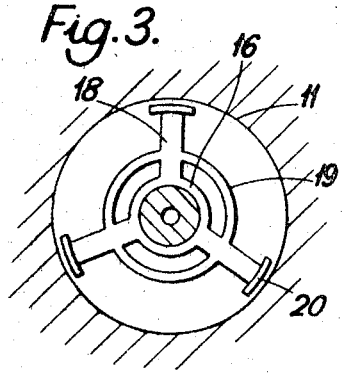
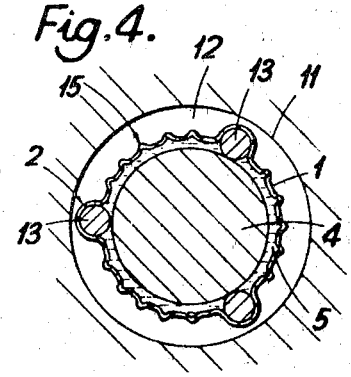
Inventors
Lucien Alfille
Jean-Claude Charrault
François LaFontaine
By Stevens, Davis, Miller & Mosher
Attorneys March 14, 1967 L. ALFILLE ETAL 3,309,283
FUEL PENCILS HAVING A THIN FLEXIBLE CAN FOR NUCLEAR REACTORS
Filed July 19, 1965 2 Sheets-Sheet 2

Inventors
Lucien Alfille
Jean-Claude Charrault
François LaFontaine
By Stevens, Davis, Miller & Mosher
Attorneys

United States Patent Office 3,309,283
Patented Mar. 14, 1967

3,309,283
FUEL PENCILS HAVING A THIN FLEXIBLE CAN FOR NUCLEAR REACTORS
Lucien Alfille, Paris, France, and Jean-Claude Charrault, Rasco-Upanne, Varese, and François Lafontaine, Ispra, Varese, Italy, assignors to European Atomic Energy Community—Euratom, Brussels, Belgium
Filed July 19, 1965, Ser. No. 472,972
Claims priority, application Belgium, Aug. 12, 1964, 1,732/64
13 Claims. (Cl. 176—72)

The invention relates to a fuel pencil for use in nuclear reactors, including pressure fluid cooled power reactors and is particularly but not exclusively concerned with pencils of the type which are placed in a guiding channel imposing upon the pencil a closely defined geometry, and which comprise a substantially cylindrical can, preferably of stainless steel with a thickness of 0.1 mm. or less, and which has, in the part between terminal closure-receiving zones, parallel longitudinal corrugations which permit radial distortion and, at at least one of the ends of the said part, peripheral or helical corrugations permitting axial distortions, the last-mentioned corrugations being in a zone which extends from the longitudinal corrugations, the can extending around a fissile rod or fissile pastilles with radial and longitudinal clearance, a low neutron absorption material which is a good heat conductor filling the clearance, such material preferably being a metal or alloy which is plastic at the working temperatures of the pencil in the reactor, and two plugs for closing the can ends.

Fuel elements of this kind form the subject matter of the applicants' United States Ser. No. 288,081 for "Fuel Rods for Nuclear Reactors" filed on June 17, 1963, now U.S. Patent No. 3,274,069, issued on Sept. 20, 1966, and No. 433,545 for "Closure Method and Means for the Ends of Nuclear Fuel Rods Having a Very Thin Sheath," filed Feb. 15, 1965, now U.S. Patent No. 3,268,411, issued on Aug. 23, 1966.

In fuel pencils of this kind, the can, being very thin and usually 0.1 mm. or less thick, is not inherently rigid and so, since the pencil is usually of large diameter, the can is strengthened by means of the distortable corrugations or folds whose convexity faces outwards and by means of the metal cushion or mattress or buffer or the like which is plastic when hot and which fills the clearance between the can and the fuel and fills up the hollow interiors of the corrugations. The can can therefore withstand very high outside pressures without experiencing severe stressing by pressing against the hydrostatically stressed plastic cushion, and the can can withstand forces produced by heat expansion of the fuel and of the cushion and by variations in fuel dimensions during radiation, for these forces are transmitted to the corrugations by hydrostatic deformation and do not overstress the can material.

The transverse stiffness of such pencils is very slight and is particularly slight in the case of ceramic fuel or of a stack of pastilles; consequently, for use in a reactor the pencils must be placed in "guiding channels" which require the presence of a closely defined geometry near the pencil while allowing limited radial variations thereof, a restricted vein of cooling fluid being able to flow between the channel inside surface and the pencil outside surface. The term "guiding channel" as used hereinafter includes, inter alia, partial or complete graphite structures such as the dismantleable construction described in the applicants' United States Ser. No. 263,351 for "Improvements to Nuclear Fuel Elements" filed on Mar. 6, 1963, now abandoned, such structures containing a bunch of pencils with a cylindrical cavity around each pencil, and being contained in a hollow cylindrical element forming an actual channel.

A disadvantage of a system where the pencil is centered in the channel by means of longitudinal corrugations or folds which permit radial distortion of the can and which can bear against the channel inside surface is that the longitudinal corrugations, when urged by local compression against the channel surface by local compression acting on their outer radial edge may become permanently distorted locally by being flattened and thus cause a radial variation in the cooling fluid vein, with dangerous results, particularly if the vein is very thin, on the thermal equilibrium of the pencil and therefore in the long run on the satisfactory state thereof. This disadvantage militates against the use of such pencils in reactors having "individual" pressure tubes—i.e. reactors having "hot" pressure tubes where the shell tube has in it not just a single pressure tube in which the fuel is subdivided into pencils arranged in "bunches," but a number of independent pressure tubes each containing a stack of fuel pencils, as described in the applicants' United States Ser. No. 385,194 for "Assembly of Fuel Elements for Nuclear Reactors" filed on July 27, 1964, now abandoned in favor of continuation application Ser. No. 571,945, filed Aug. 11, 1966, now pending. The reason for this is that since the pencil ends are not engaged in the supports or cross-members of the bunches, the pencils of the stack are very likely to be stressed by radial compression forces tending to force them against the channel surface.

The present invention relates to a fuel pencil which, since it has provision enabling it to remain in a predetermined axial geometric position in an annular vein of cooling fluid in a channel, reduces the disadvantages mentioned and is also of use in reactors having "individual" pressure tubes. It is a main object of the invention to provide a fuel pencil of the kind specified comprising an internal strengthening or stiffening system for some longitudinal corrugations permitting radial deformation of the can, such corrugations being adapted to bear against the channel surface, the pencil, in its preferred form, having provision for centering its ends so that an adequate effective cross-section of the vein of cooling fluid is always present in the pencil channel over the whole length of the pencil.

In its broad form the invention provides a fuel pencil for use in a nuclear reactor and comprises a substantially cylindrical can having at, at least, one end zone circumferential or helical corrugations which permit axial distortion and between the end zones longitudinal corrugations which permit radial distortion, characterized by stiffening or strengthening members within at least some of the longitudinal corrugations.

In a preferred form of the invention, the can has, for centering the can in the channel, longitudinal corrugations which are uniformly spaced over the can surface and whose height is greater than the height of the peripheral or helical corrugations and whose interior is taken up by stiffening or strengthening members disposed between the can and the fuel in contact therewith; and such pencil has at both ends members adapted to maintain it centered on the channel axis.

Figure 6A:
Figure 7A:
Figure 5B:
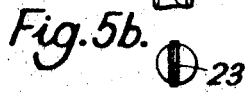
Figure 6B:
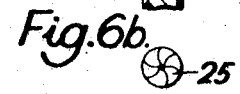
Figure 7B:
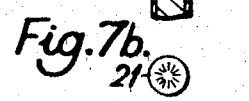
Figure 8:
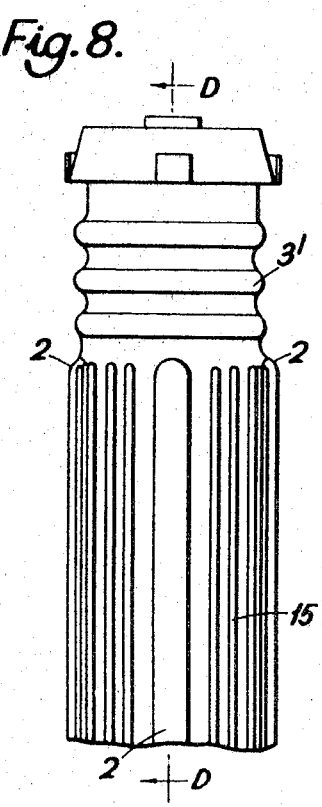
Figure 9:
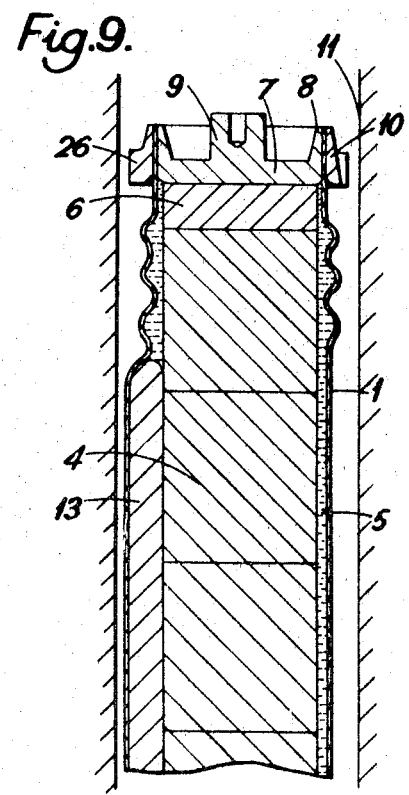
Figure 10:
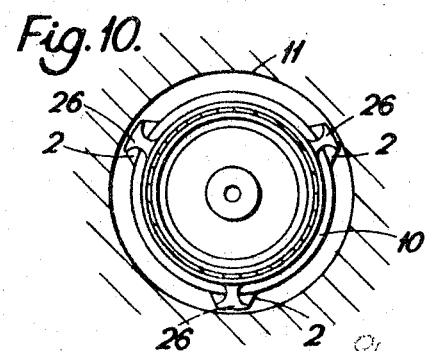

Other features and particulars of the invention will be disclosed by the following description of two specific examples, reference being made to the accompanying drawings wherein:

FIGURE 1 is an elevation of a fuel pencil according to the invention,
FIGURE 2 is a view in longitudinal section corresponding to FIGURE 1,
FIGURE 3 is a section on the line A—A of FIGURE 2,
FIGURE 4 is a section taken along the line B—B of FIGURE 2,
FIGURES 5a, 6a and 7a are views in longitudinal section showing details of three ways in which the ends of one particular kind of stiffening element are contrived, FIGURES 5b, 6b, 7b are plan views corresponding to FIGURES 5a, 6a and 7a respectively, FIGURE 8 is an elevation of another embodiment of a fuel pencil according to the invention, FIGURE 9 is a view in longitudinal section corresponding to FIGURE 8, and FIGURE 10 is a plan view of the pencil shown in FIGURES 8 and 9.

Referring first to FIGURES 1–4, which shows one embodiment of the fuel pencil having a thin flexible can (also called a sheath, clad or jacket), there can be seen a cylindrical stainless steel can 1 of from 0.05 to 0.1 mm. thick; the can 1 has longitudinal corrugations 2 and 15 for radial deformation and cooling and helical corrugations 3 for axial deformation, the helical corrugations 3 in this example extending from the ends of the longitudinal corrugations 2 towards the ends of the can 1.

Fuel pastilles 4 are placed in the can 1 and are surrounded by a metallic substance 5 which takes up the space between the pastilles and the can; at the working temperature of the pencil in the reactor, the material 5 forms a plastic cushion around the fuel. Also visible are a refractory pastille 6 and a can end closure plug 7 having a raised edge 8 and a central boss 9. A ferrule 10 is provided to hold the can around the plug and is welded to the ends of the can and of the edge 8. The pencil is introduced into a guiding channel or "individual" pressure tube 11, and cooling fluid flows in the space 12 between the pencil and the channel or tube 11.

Stiffening or strengthening wires 13 are provided in the three longitudinal corrugations 2, which are equidistant from one another. The wires take up the interior and intimately follow the curvature of the corrugations in which they are received, and act as a bearing frame for the particular corrugations 2 concerned by bearing against the pastilles 4, to obviate distortion of the corrugations when the pastilles are forced towards the surface of the channel 11. By bearing against such surface, the corrugations which are reinforced by the wires 13 help to center the pencil in the flow of cooling fluid in space 12 and prevent the effective cross-section of the fluid from varying, but can still distort allowing the can 1 to be adapted to the plastic cushion 5 by the outside pressure and by forces transmitted to the can 1 by heat and irradiation distortions of the fuel 4. At the pencil ends discs or spiders 14 are secured to the bosses of the plugs 7 and help to support the ends of the can where the helical corrugations 3 are disposed.

The viscous cushion 5 which fills the space between the can and the fuel in the parts between the wires 13, helps to increase the heat-exchange area of the can 1; the same is formed on those parts of its surface which are between the corrugations 2, with small cooling corrugations 15 parallel with the corrugations 2.

The corrugations 2 which, like the corrugations 3 and 15, are formed by plastic deformation of the thin tube forming the can, merge with such tube by way of two identical fillets and have a height and radius of curvature greater than the height and radius of curvature of the helical corrugations 3, so that the cooling fluid has an adequate flow cross-section in the channel 11 at the end zones of the pencil. The corrugations 2 meet with the corrugations 3 by way of a portion of corrugations whose height and radius of curvature vary gradually from the values associated with the corrugations 2 to the values associated with the corrugations 3.

As FIGURES 2 and 4 show, the spider or the like 14 whose central portion 16 is secured to the boss 9 by a screw 17 has radial arms 18 which are strengthened by an annular portion 19 and terminate in ends 20 bent to bear (e.g. resiliently) against the wall of the channel 11.

The wires 13 are made of a material which stays sufficiently rigid and without becoming viscous at the maximum working temperature of the pencil in the reactor to be able to keep the corrugations in shape during local thermal stressing caused by mechanical centering of the pencil; also, the wire material must not react at the working temperatures with the can metal nor with the fuel nor with the filling material 5. Preferably, the material used for the wires 13 is zirconium, since it does not react with uranium oxide, uranium carbide and stainless steel at temperatures of up to 500° C. For instance, a combination which can be used in an organic liquid cooled reactor having a maximum temperature of 500° C. is 18/8 type stainless steel for the can, uranium carbide as fuel, a magnesium alloy having 0.6% of zirconium as the plastic cushion, and zirconium for the wires. Wires of other materials having good nuclear characteristics and the necessary mechanical properties at the working temperature and good compatibility with the other materials around them can be used, such as beryllium wire. A stainless steel wire can be used; preferably, however, to reduce neutron absorption problems a "thermocoax" wire is used, which comprises a thin cylindrical stainless steel sheath a few hundredths of a millimetre in thickness and containing powdered magnesia in a highly compressed state, for instance, compressed at from 90 to 95% of the theoretical density. The advantage of such wire is that it has good compression strength and relative deformability without risks of breakage.

As FIGURES 5a, 5b, 6a, 6b and 7a, 7b show, there are various ways of closing the ends of this kind of wire to prevent the powdered magnesia from crumbling in the event of local stressing. Referring to FIGURES 5a and 5b, after removal of the end portions of the magnesia 22 the end of the sheath 21 is nipped for a distance of from 2 to 3 mm. With this arrangement the resulting closure ridge 23 must be placed at a tangent to the fuel pastilles when the wire is assembled in the corrugations 2.

However, it is difficult to maintain the wire in such a position when the can 1 is being filled with the plastic material 5; consequently, and as shown in FIGURES 6a and 6b, after removal of the magnesia, a stainless steel disc 24 is introduced into the sheath 21 and the lip 25 of the sheath is bent over completely around the disc 24; alternatively, and as shown in FIGURES 7a and 7b, the end of the sheath 21 is brought to a conical shape and the cone apex is spark welded. Preferably, to facilitate retention of the wires 13 in the corrugations 2 and to obviate difficulties during the filling of the can 1 with the plastic material 5, the wires 13, whether or not they are of the thermocoax type, are made with ends which vary progressively in dimensions, from the radius of the longitudinal corrugations to the radius of the helical corrugations, in order to be partly overlapped in the transition zone between the corrugations 2 and the corrugations 3.

An alternative form for centering the ends of the pencil is shown in FIGURES 8–10 which show another form of pencil where the can end zones are formed with peripheral corrugations 3' separate from the longitudinal corrugations 2. As FIGURES 9 and 10 show, the ring 10 has equidistant wings or the like 26 to center the pencil in the channel 11. The wires 13 maintain the longitudinal corrugations 2 by bearing solidly against the fuel, and if the fuel is ceramic, fragmentation of one or more of the pastilles 4 does not cause any great distortion in the position of the wire which remains in bearing engagement with the other pastilles. Similarly, the relatively rigid wire is little distorted by deformation of the fuel during irradiation, such as swelling, and by the pastilles sliding relatively to one another.

The invention has been described with reference to particular constructions but is not of course limited thereto and can be varied. For instance, the can 1 can be formed with radial distortion longitudinal corrugations interleaved with wire-filled corrugations 2 which are of the same height as the other longitudinal corrugations or even slightly lower. Also, the pencil ends can be centered by centering means other than the elements 14 and 26. Nor need the cross-section of the wire 13 be circular, as the drawings show: instead, it can be, for instance, elliptical or oval provided that it is such that the wire can match the shape of the corrugations and bear against the fuel.

We claim:

1. A fuel pencil for use in nuclear reactors including pressure fluid cooled power reactors, said pencil being placed in a guiding channel in a close fitting relationship, said pencil comprising a cylindrical sheath which is preferably made of stainless steel whose thickness is no greater than 0.1 mm. and which has in a portion between terminal enclosure receiving end zones a plurality of parallel longitudinal corrugations which permit radial distortion, at least one end of said sheath having corrugations permitting axial distortion, said last-mentioned corrugation being in a zone forming an extension of the portion containing the longitudinal corrugations, said sheath enclosing a fissile material with radial and longitudinal clearance, a low neutron absorbing material which is a good heat conductor filling said clearance, such material preferably being made of an alloy which is plastic at the working temperatures of the pencil in the reactor, means for closing the ends of said sheath, said means including means for centering said sheath within the channel and secondary longitudinal corrugations which are uniformly spaced apart over the entire surface and whose height is greater than the height of the longitudinal corrugations, stiffening members disposed within said secondary corrugations contacting both said fuel element and said sheath, said pencil having at both ends a member adapted to maintain the latter centered in the channel.

2. A fuel pencil for use in nuclear reactors including pressure fluid cooled power reactors in which said pencil is placed in a guiding channel in close fitting relationship, said pencil comprising a cylindrical sheath, said sheath comprising terminal enclosure receiving zones at each end portion thereof and a central portion, a plurality of parallel longitudinal corrugations formed in said central portion and permitting radial distortion, at least one end zone of said sheath having therein corrugations permitting axial distortion, fissile materials placed within said sheath and having radial and longitudinal clearance therewith, a low neutron absorbing material which is a good heat conductor filling the clearance between said fissile material and said sheath, said material preferably being plastic at the working temperatures of the pencil within the reactor, plug means for closing said sheath end, said plug means carrying thereon means for centering said sheath within the guiding channel, means disposed within said sheath and arranged within said longitudinal corrugations for strengthening said sheath, said strengthening means contacting said fuel element.

3. A fuel pencil according to claim 2 in which said sheath is preferably made of stainless steel whose thickness is no greater than .1 mm.

4. A fuel pencil according to claim 2 in which the corrugations in the end zone are peripheral corrugations.

5. A fuel pencil according to claim 2 in which the corrugations in said end zones are helical.

6. A fuel pencil according to claim 2 in which the strengthening means comprises a wire of preferably circular cross-section and of a metal such as zirconium which is appropriately rigid at the pencil working temperature and is satisfactorily compatible with said fuel, the sheath metal and the material which fills the gap between said sheath and said fuel.

7. A fuel pencil according to claim 2 in which the strengthening means is in the form of preferably a circular cross-sectional area and is of a metal such as beryllium which is appropriately rigid at the pencil working temperatures and is satisfactorily compatible with the fuel, the sheath metal, and the material which fills the gap between the sheath and the fuel.

8. A fuel pencil according to claim 2 in which the strengthening means is in the form of a preferably circular cross-section alloy which is appropriately rigid at the pencil working temperatures and it is satisfactorily compatible with the fuel, the sheath metal and the material which fills the gap between the sheath and the fuel.

9. A fuel pencil according to claim 2 in which the strengthening means is in the form of a thin stainless steel cylindrical sheath which is no greater than 0.1 mm. thick and which contains powdered magnesia in a highly compressed form from 90 percent to 95 percent of the theoretical density.

10. A fuel pencil as set forth in claim 2 in which the member for centering the pencil ends in the channel are disks secured to the sheath closure plugs.

11. A fuel pencil as set forth in claim 2 in which the members for centering the pencil ends in the channel are spiders secured to the sheath closure plugs.

12. A fuel pencil according to claim 2 comprising a ferrule around at least one of the can ends, said ferrule being welded to the sheath end and to a raised edge on the closure plug, the member for centering the pencil end in the channel being a flange-like extension on said ferrule.

13. A fuel pencil according to claim 2 in which the sheath surface zones between the longitudinal corrugations permitting the radial deformation are formed with corrugations which are parallel with the aforementioned corrugations and are of a lesser height.

References Cited by the Examiner

FOREIGN PATENTS 978,737  12/1964  Great Britain.

CARL D. QUARFORTH, *Primary Examiner.*

BENJAMIN R. PADGETT, *Examiner.*

M. J. SCOLNICK, *Assistant Examiner.*